(12) United States Patent
Downie et al.

(10) Patent No.: US 10,676,323 B2
(45) Date of Patent: Jun. 9, 2020

(54) FLUE MOUNTED HOIST

(71) Applicant: Clevatech Ltd, Cheltenham (GB)

(72) Inventors: Simon Downie, Cheltenham (GB); Carl Nesbit, Wigan (GB)

(73) Assignee: CLEVATECH LTD (GB)

( * ) Notice: Subject to any disclaimer, the term of this patent is extended or adjusted under 35 U.S.C. 154(b) by 191 days.

(21) Appl. No.: 15/879,898

(22) Filed: Jan. 25, 2018

(65) Prior Publication Data

US 2018/0208442 A1    Jul. 26, 2018

(30) Foreign Application Priority Data

Jan. 25, 2017    (GB) .................................. 1701219.6

(51) Int. Cl.

| | |
|---|---|
| *B66C 1/22* | (2006.01) |
| *B66C 1/12* | (2006.01) |
| *F22B 37/24* | (2006.01) |
| *B66C 23/20* | (2006.01) |
| *B66C 1/10* | (2006.01) |
| *B66C 23/22* | (2006.01) |
| *F23J 13/00* | (2006.01) |
| *F24H 9/06* | (2006.01) |

(52) U.S. Cl.
CPC ................ *B66C 1/223* (2013.01); *B66C 1/10* (2013.01); *B66C 1/12* (2013.01); *B66C 23/208* (2013.01); *B66C 23/22* (2013.01); *F22B 37/24* (2013.01); *F23J 13/00* (2013.01); *F23J 2213/60* (2013.01); *F24H 9/06* (2013.01); *Y02E 20/14* (2013.01)

(58) Field of Classification Search
CPC ..................................................... B66C 1/223
See application file for complete search history.

(56) References Cited

U.S. PATENT DOCUMENTS

| | | | | |
|---|---|---|---|---|
| 3,135,396 A | * | 6/1964 | Grainger | B25J 3/00 414/8 |
| 3,861,987 A | * | 1/1975 | Harbert | B25J 21/00 156/556 |
| 4,858,890 A | * | 8/1989 | Fowler | B66C 23/208 254/335 |
| 5,379,664 A | * | 1/1995 | Kershaw | B25J 9/146 74/490.05 |
| 5,482,169 A | * | 1/1996 | Simon | B25J 21/00 212/245 |

(Continued)

FOREIGN PATENT DOCUMENTS

| | | |
|---|---|---|
| CA | 2424170 A1 | 10/2004 |
| CN | 2695429 Y | 4/2005 |

(Continued)

OTHER PUBLICATIONS

GB1701219.6 Search Report dated Sep. 6, 2017.

(Continued)

*Primary Examiner* — Nathaniel Herzfeld
(74) *Attorney, Agent, or Firm* — Invention To Patent Services; Alex Hobson (57) ABSTRACT

A flue mounted hoist includes an anchor section for anchoring within a flue hole, and an extendable arm. A winch is provided at the end of the extendable arm for attachment to a boiler. The flue mounted hoist allows safe lifting and installation of a wall-mounted boiler by a single person.

20 Claims, 9 Drawing Sheets

(56) References Cited

U.S. PATENT DOCUMENTS

| | | | | |
|---|---|---|---|---|
| 5,855,540 A | * | 1/1999 | Sturm, Jr. | ............ B25J 15/0491 |
| | | | | 483/16 |
| 6,478,172 B2 | * | 11/2002 | Zingerman | ............. B66C 23/22 |
| | | | | 212/179 |
| 7,407,039 B2 | * | 8/2008 | Bailey | ................... B66C 23/208 |
| | | | | 187/240 |

FOREIGN PATENT DOCUMENTS

| | | |
|---|---|---|
| CN | 105668445 A | 6/2016 |
| DE | 3330142 C1 | 10/1984 |
| EP | 0570286 A2 | 11/1993 |
| FR | 588590 A | 5/1925 |
| FR | 2471348 A1 | 6/1981 |
| FR | 3053598 A1 | 1/2018 |
| GB | 939981 | 10/1963 |
| GB | 1378782 | 12/1974 |
| WO | 2013063831 A1 | 5/2013 |

OTHER PUBLICATIONS

European Search Report by EPO dated Jul. 17, 2018.
Search Report Under Section 17(5) by UK Intellectual Property Office dated Jul. 10, 2018.

* cited by examiner

FLUE MOUNTED HOIST

CROSS REFERENCE TO RELATED APPLICATIONS

This application claims the benefit of priority to GB 1701219.6 filed on 25 Jan. 2017; the entirety of which is hereby incorporated by reference herein.

BACKGROUND OF THE INVENTION

Field of the Invention

The present invention relates to a hoist, in particular to a hoist which can be mounted to a flue hole drilled through a wall of a building and used to raise or lower a boiler for installation or deinstallation.

Background

In a typical installation, a small to medium sized domestic central heating boiler is wall-mounted. The boiler is fixed to the wall, usually by hanging the boiler from a bracket which is supplied with the boiler and designed to suit the particular model. The boiler is typically hung on an outside wall of a building, and the flue for exhaust gas is routed through the wall and out of the building. Often, the flue passes out of the building through a hole in the wall which is drilled just above the boiler. Flues are provided in various sizes but are usually substantially circular and typically range between about 100 mm and 130 mm diameter.

Boilers are heavy, typically over 30 kg. They are also large in size. It is therefore difficult and unsafe for a single person working on their own to lift the boiler and hang it on the wall. Installing a boiler is otherwise a job which can be done by one person, but lifting the boiler safely requires two people. Where an old boiler is being replaced, similarly lowering the old boiler requires two people. This significantly adds to the cost of an installation or replacement job.

Boilers are often installed in kitchens, above worktops. The fitted kitchen unit can therefore be an obstacle hindering installation. The boiler can be lifted onto the worktop, but it may then be difficult to complete the remainder of the lift to hang the boiler on the wall bracket, above the worktop. Installers could attempt to stand on the floor in front of the kitchen units and lift the boiler, but the presence of the units will stop the installers from getting close to the wall for an easy lift. Alternatively, the installers could stand or kneel on the worktop to lift the boiler onto the bracket, but again this is far from an optimal position for safe and easy lifting. Fixtures such as kitchen sinks may obstruct the process, and it is not uncommon for the boiler and/or kitchen fixtures to become damaged during a boiler installation or deinstallation.

It is an object of the invention to solve the above-mentioned problems by providing a hoist which allows a boiler to be safely installed or replaced by one person working alone.

SUMMARY OF THE INVENTION

According to the present invention, there is provided a boiler hoist comprising a rigid elongate anchor for mounting in a flue hole drilled through a wall of a building, and hoisting means for connection to a boiler for lifting or lowering the boiler.

In a typical scenario where a boiler is being installed on an outside wall with the exhaust flue provided through the wall just above the boiler, the boiler hoist provides a very convenient means of lifting the boiler for installation, and/or of lowering an old boiler being removed for replacement. First, a flue hole is drilled through the wall. In the case of a replacement job, the flue hole will already be present. A boiler is typically provided with a purpose-made bracket for hanging the boiler on the wall. The bracket is fixed to the wall in the correct position, at a measured distance below the flue hole, in the normal way. The elongate rigid anchor is then inserted from the inside of the building, through the flue hole, to provide a strong anchor just above the highest position where the boiler needs to be during installation. The boiler is then connected to the hoisting means, and the hoisting means can then be operated to lift the boiler. Where a hanging bracket is used, the hoisting means may be used to lift the boiler to a position just above its final installed position, over the bracket, and then slowly lowered again, typically just by a few centimetres, until the boiler rests in its final position, hung on the bracket. Extra fixings may then be added to retain the boiler to the wall and prevent it from becoming unhooked from the bracket. Once the boiler is safely hung on the wall, the hoisting means may be disconnected from the boiler, and the elongate anchor removed from the flue hole. The boiler and flue installation may then be completed, and the various other connections made (i.e. in the case of a combination condensing boiler, to electricity, mains water, heating circuit, gas or other fuel supply, DHW outlets, and condensate drain).

Preferably, the elongate anchor passes through most or all of the thickness of the outside wall. The anchor is preferably in contact with an upper inside surface of the flue hole at a point spaced from the inside of the building. It is the upper inside surface of the flue hole which will provide a reaction force to the weight of the boiler when connected to the hoisting means. The anchor will also contact the lower inside surface of the flue hole adjacent the inside surface of the wall of the building. This point acts as a pivot. For the maximum reaction moment to best support a heavy boiler, the horizontal distance between the pivot and the point of contact with the upper inside surface of the flue hole should be as great as possible.

The boiler hoist may include an arm which extends from the anchor, into the building when in use. Preferably, the arm is of adjustable length. An adjustable length arm has a number of advantages. Firstly, it allows the hoist to be used optimally with a variety of different models of boiler, which may all differ in dimensions. An adjustable length arm also allows a boiler to be lifted spaced from the wall, so that scraping against the wall and damage to paintwork, plasterwork etc. can be avoided, and then pushed towards the wall for finally lowering a few centimetres to hang the boiler on its bracket. Finally, an adjustable arm which extends far enough assists in the common situation where a boiler is being installed above a kitchen worktop. Without removing or risking damage to the fitted kitchen, the boiler can be lifted well in front of the kitchen units, above the level of the worktops. The adjustable arm may then be retracted to move the boiler towards the wall, above the worktop, for hanging on its bracket.

The adjustable arm may be telescopic. Telescopic sections may be mounted to each other via rollers and/or rails for easy sliding under load.

A flange may separate the elongate anchor from the arm. Preferably, the flange is larger than the maximum size of a flue hole, and so provides a limit as to how far the boiler hoist may be pushed into the flue hole, and prevents the boiler hoist from accidentally falling through the flue hole and out of the building.

In some embodiments, the arm when retracted may substantially sit within or otherwise alongside the elongate anchor, i.e. on extension and retraction the arm may pass through the flange.

The elongate anchor may include a moveable ram which extends out of the elongate anchor, in a direction substantially perpendicular to the elongate extent of the anchor. The ram is movable towards and away from the elongate anchor in a direction substantially perpendicular to the elongate extent of the anchor. This allows the anchor to be fitted in flue holes of differing diameters, and ensures a good fit and a strong anchor despite the inevitable variance in the diameter of a drilled hole which is nominally of a particular diameter. Preferably, the ram is retracted into the body of the anchor, then the anchor is slid into the flue hole. With the ram retracted, the elongate anchor is preferably thin enough to slide easily into even a small-diameter flue hole. When the elongate anchor is fully inserted, the ram may be extended. Preferably, the ram extends from the top side of the elongate anchor so that, with the ram extended, the ram contacts an upper inside surface of the flue hole in a region spaced from the inside of the building, preferably as close as possible to the outside of the building. The entire extent of the lower surface of the elongate anchor is then clamped against the lower inside surface of the flue hole.

One embodiment of the movable ram is in the form of a scissor jack mechanism. This may be driven by a threaded rod which passes within the elongate anchor, from the scissor jack mechanism to a control handle which is accessible from inside the building, for example mounted on the flange between the elongate anchor and the arm.

Preferably, the position of the movable ram along the elongate anchor may be adjustable. This allows the ram to be placed in an optimum position for walls of differing thicknesses. Brick cavity walls, for example, have cavities of differing thicknesses. The optimum position for the ram is on the outer skin of a cavity wall.

Preferably, the elongate anchor passes all the way through the flue hole and extends outside the building when fitted. In one embodiment, a clamp is provided for deploying from the elongate anchor outside the building, and clamping against an outer surface of the wall of the building. Preferably, the clamp extends below the elongate anchor in a direction substantially perpendicular to the elongate extent of the anchor, to clamp against the outer surface of the building wall below the anchor. The clamp is ideally retractable into the elongate body of the anchor to allow the anchor to be inserted and removed through the flue hole. The position of the clamp along the length of the elongate anchor may be adjustable for use with walls of different thicknesses. In use, the elongate anchor may be clamped to the wall from either side, with the flange defining the boundary of the anchor against the inside surface of the wall, and the clamp against the outside surface of the wall.

The clamp may be movable along the length of the elongate anchor by means of a screw thread. The clamp may be spring loaded into an extended position, being retractable into the body of the elongate anchor against the action of the spring. Preferably, a hook is provided near the distal end of the elongate anchor (i.e. the end where the flange is not). The hook may act to retract the clamp against the spring when the linear position of the clamp is at the extreme end of its travel, allowing the clamp to be disengaged and the elongate anchor easily inserted or removed.

The hoisting means may include a winch. The winch may include a spool for a lifting line, a gearbox and a drive shaft. The gearbox is preferably a very high ratio gear box providing a high output torque to the spool at low speed, from a high speed but low torque input to the drive shaft. Preferably, the gearbox includes a worm and wheel drive, with the worm on the low torque input and the worm wheel on the high torque output. It is found that the gear ratio in such an arrangement may be sufficient not only to allow lifting of a heavy boiler with low drive torque, but also to provide sufficient resistance in the drivetrain that the weight of the boiler will be reliably held at any position, without the need for a brake or lock. With the drive shaft left completely free, no movement of the spool will occur unless the drive shaft is being turned.

The drive shaft may be turned manually with a handle, but preferably a connection will be provided, for example to connect a cordless drill. In some embodiments an electric motor could be provided as part of the hoisting means, but as long as the scale of the device makes it suitable, it is considered preferable in most cases to just provide an attachment for a cordless drill, since this reduces the cost, complexity and component count of the boiler hoist, makes failure of the hoist less likely, and a drill is in any case a tool which a boiler installer inevitably will already need to complete a boiler installation or replacement job.

The cross section of the elongate anchor may be any convenient shape. In many embodiments, the elongate anchor is not designed to contact the inside of the flue hole apart from along a bottom portion and via the extendable ram, and so the physical arrangement of the parts which do not contact will be dictated primarily by manufacturing considerations, and to accommodate other parts. Along the bottom portion of the elongate anchor, it is preferable to provide substantially curved sections for maximum contact with the interior surface of a flue hole, which will normally be substantially circular. Between the curved sections, a channel may be provided to define a region along the very bottom of the elongate anchor which does not contact the inside of the flue hole. This channel provides a space for the moveable clamp and associated mechanism.

The lifting line, which may be for example a rope, cord, or cable, may be attached to the boiler in any suitable way. Boilers are not typically provided with lifting eyes and so a lifting frame having an eye for attachment to the lifting line needs to be fitted to the boiler.

In one embodiment, a lifting frame for a boiler comprises a pair of parallel bars for contacting an upper surface of the boiler, and a cross bar attached between the two parallel bars, the cross bar having a lifting eye. The parallel bars may be arranged on the upper surface of the boiler, substantially parallel to lateral sides of the boiler. Preferably, the parallel bars include indentations or other locating means for locating straps. Preferably, two pairs of locating means are provided—one pair of locating means for locating a strap passing around the top, bottom and lateral sides of the boiler and over the top of both parallel bars close to the front of the boiler, and another pair of locating means for locating a strap parallel to the first strap, passing around the top, bottom and lateral sides of the boiler and over the top of both parallel bars close to the back of the boiler. A third strap may then be provided substantially centrally around the front, back and sides of the boiler, i.e. running perpendicularly to the first two straps and over the top of the first two straps. This arrangement is found to hold the lifting frame with the lifting eye firmly on to the boiler, without damaging the boiler.

The lifting eye may be provided substantially centrally on the cross bar. In some embodiments, multiple lifting eyes may be provided. This is useful for boilers where the flue attachment is offset from the centre of the boiler, so that the boiler can be lifted in line with the flue attachment for easy connection to the flue hole. Also, even for boilers with a centrally-mounted flue attachment, in some scenarios installation constraints may mean that the boiler has to be installed in a position offset form the flue hole.

An alternative embodiment of a lifting frame suitable for use with the boiler hoist of the invention is provided as a bar for placing across the top of a boiler and extending beyond the sides of the boiler. The bar is preferably provided with retaining flanges at either end for locating straps and preventing the straps from sliding off the ends of the bar. A lifting eye is provided on the bar and again may be provided either centrally on the bar or in an offset position. Preferably multiple lifting eyes are provided in different positions for providing an installer with multiple options. A sling may be provided for passing underneath the boiler, the sling having side attachments which in turn may be attached by straps to either end of the bar. The sling may either pass completely underneath the boiler, or alternatively might be provided as two separate parts, each part hooking underneath a bottom side edge of the boiler and the two parts being attached to the boiler in use one on each side. Preferably, the attachments of the sling may be in the form of square section braces which run substantially horizontally along sides of the boiler in use, and through which a strap may pass.

Straps may be tightened in any suitable way. For example, known ratchet straps may be suitable.

Either of the above described embodiments of lifting frames may be provided for use either with the boiler hoist of the first aspect of the invention, or with any other lifting apparatus. The lifting frames are suitable for use in any scenario where it is useful to provide a lifting eye on a boiler.

BRIEF DESCRIPTION OF SEVERAL VIEWS OF THE DRAWINGS

The accompanying drawings are included for better understanding of the invention, and to show more clearly how it may be carried into effect, preferred embodiments will now be described with reference to the accompanying drawings, in which.

DETAILED DESCRIPTION OF THE ILLUSTRATED EMBODIMENTS

Figure 1:
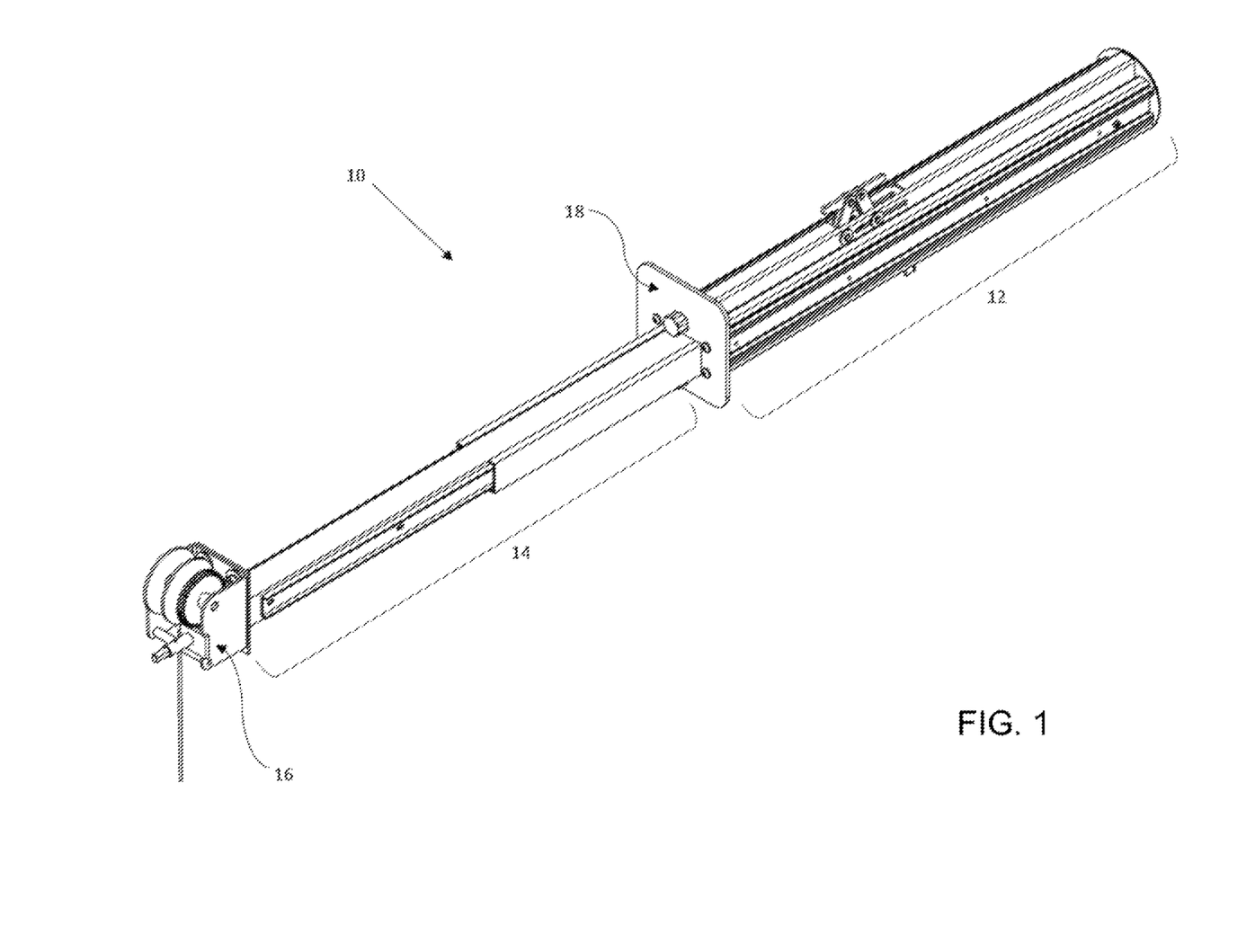
FIG. 1 is a perspective view of a boiler hoist according to the invention.

Referring firstly to FIG. 1, a boiler hoist according to the invention is indicated generally at 10. The boiler hoist 10 includes an elongate anchor section 12 for fitting a flue hole, an extending arm 14, and a winch 16 at the end of the extending arm 14. A flange 18 defines the boundary between the anchor section 12 and the extending arm 14.

The anchor section is designed to be inserted into a hole drilled through the exterior wall of a building. The hole is drilled to provide a flue/exhaust for a boiler, and typically the hole is substantially circular with diameter between around 100 mm and 130 mm. The operation of the anchor section will now be described in more detail with reference to FIGS. 2-3.

Figure 2:
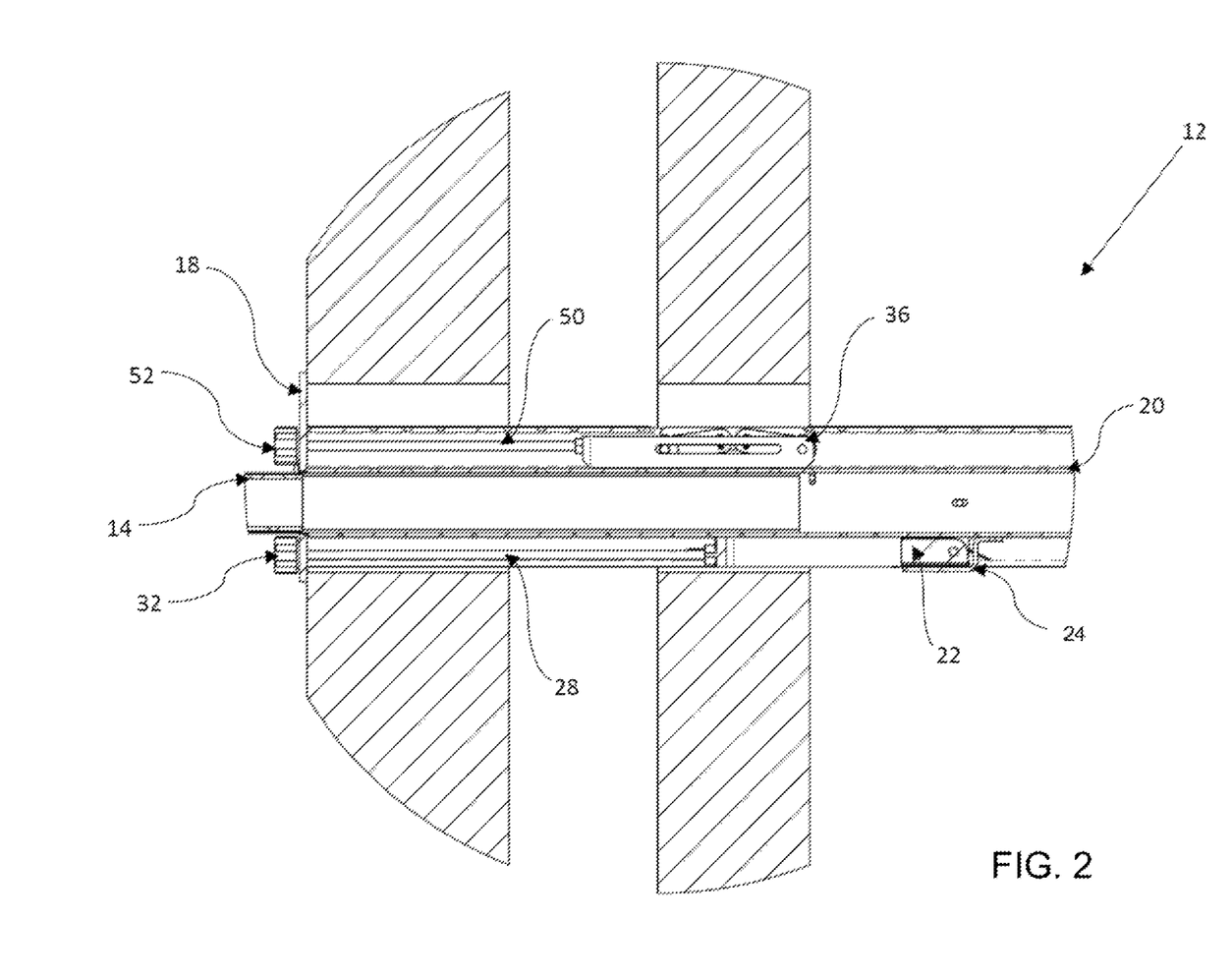
FIG. 2 is a cross-section through part of the boiler hoist of FIG. 1, with a ram and clamp retracted.
Figure 3:
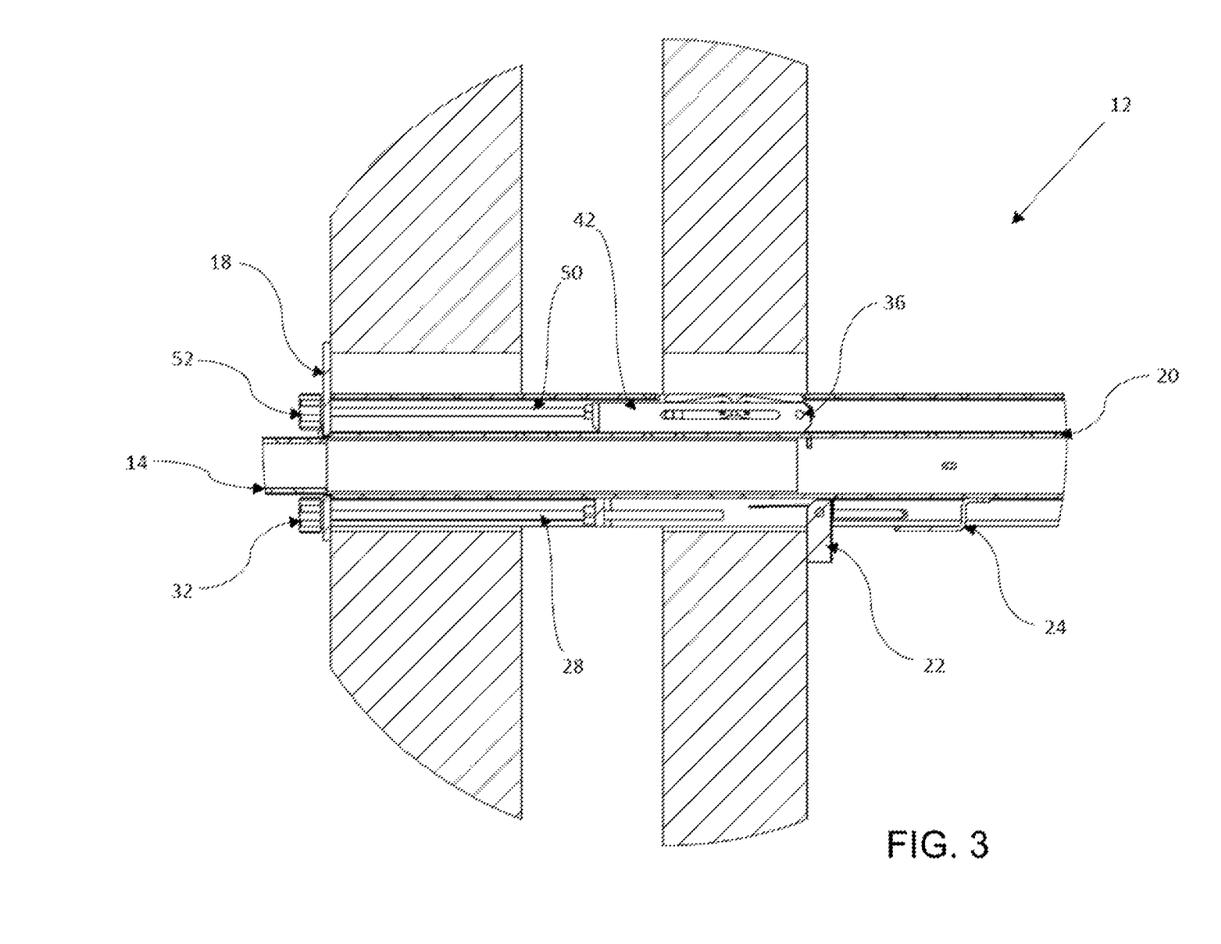
FIG. 3 is a cross-section through part of the boiler hoist of FIG. 1, with the ram retracted and the clamp extended.

An elongate body 20 of the anchor section 12 is made from a strong rigid material, for example the body 20 could be an aluminium extrusion. The body is preferably substantially hollow and may have various channels and features to accommodate and connect with other components. The body is sized to fit easily within even the smallest diameter flue hole. For example, where the smallest flue hole envisaged by the design is 100 mm, the elongate body 20 may be for example 80 mm at its widest point, so that it can fit easily through the hole without fouling on any uneven interior surfaces.

The flange 18 on the inside end of the anchor section 12 is larger than the largest flue hole envisaged by the design. For example, where the largest flue hole envisaged is 130 mm in diameter, the flange may be at least 150 mm across in at least one direction. The flange 18 therefore stops the hoist 10 passing all the way through the hole to the outside of the building—it ensures that only the anchor section 12 sits in the flue hole.

A movable clamp 22 can be moved along the length of the anchor section 12, along a channel which runs substantially along an underside of the body 20. The clamp 22 can be extended (as shown in FIG. 3) or retracted into the body 20 (as shown in FIG. 2). The clamp 22 is preferably spring loaded into an extended position, and is retracted by moving it outwards along the length of the anchor section (rightwards in FIGS. 2 and 3) until the fixed hook 24 forces it into a retracted position. The clamp and associated mechanisms are shown in more detail in FIG. 5. The clamp 22 is pivotally mounted to a carriage 26, and a spring 34 urges the clamp 22 into an extended position, substantially perpendicular to the elongate anchor 12 and extending out of the bottom of the elongate anchor 12. It is apparent from FIG. 5 that the hook 24, which is fixed to the body 20 of the elongate anchor 12, will act against the spring and cause the clamp 22 to retract when the clamp 22 is moved against the hook 24. Moving the clamp 22 is achieved by means of a threaded rod 28 which passes through a threaded aperture 30 in the carriage 26. The threaded rod 28 is attached to a handle 32 which is disposed in an accessible position on the inside of the flange 18 (see FIGS. 2, 3) The clamp 22 can therefore be moved along the length of the anchor section 12 by turning the handle 32, and can be extended or retracted simply by turning the handle to move it in or out of the fixed hook 24.

An extendable ram 36 is provided on an upper part of the anchor body 20, at a point spaced from the flange 18.

Figure 4:
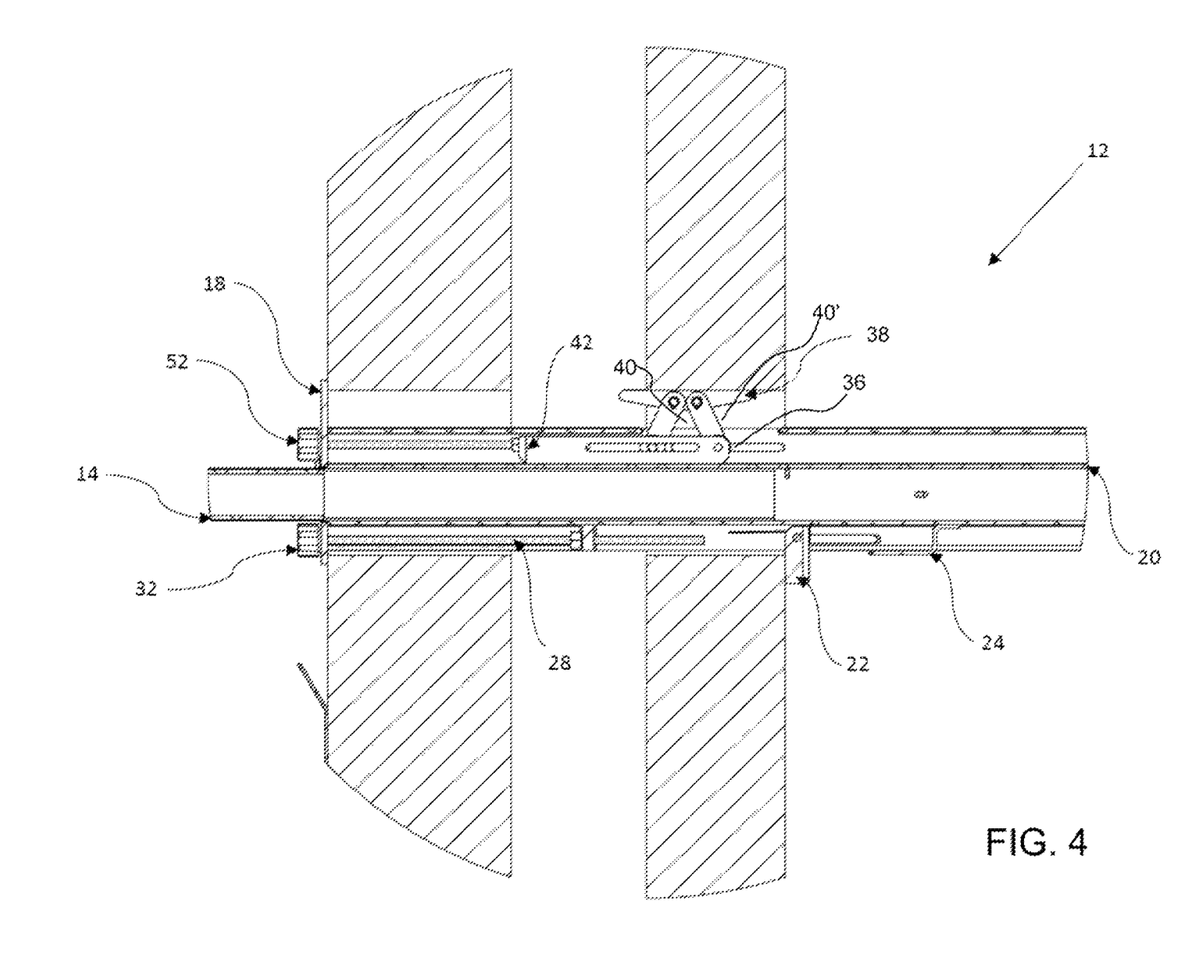
FIG. 4 is a cross-section through part of the boiler hoist of FIG. 1, with the ram extended and the clamp extended.
Figure 5:
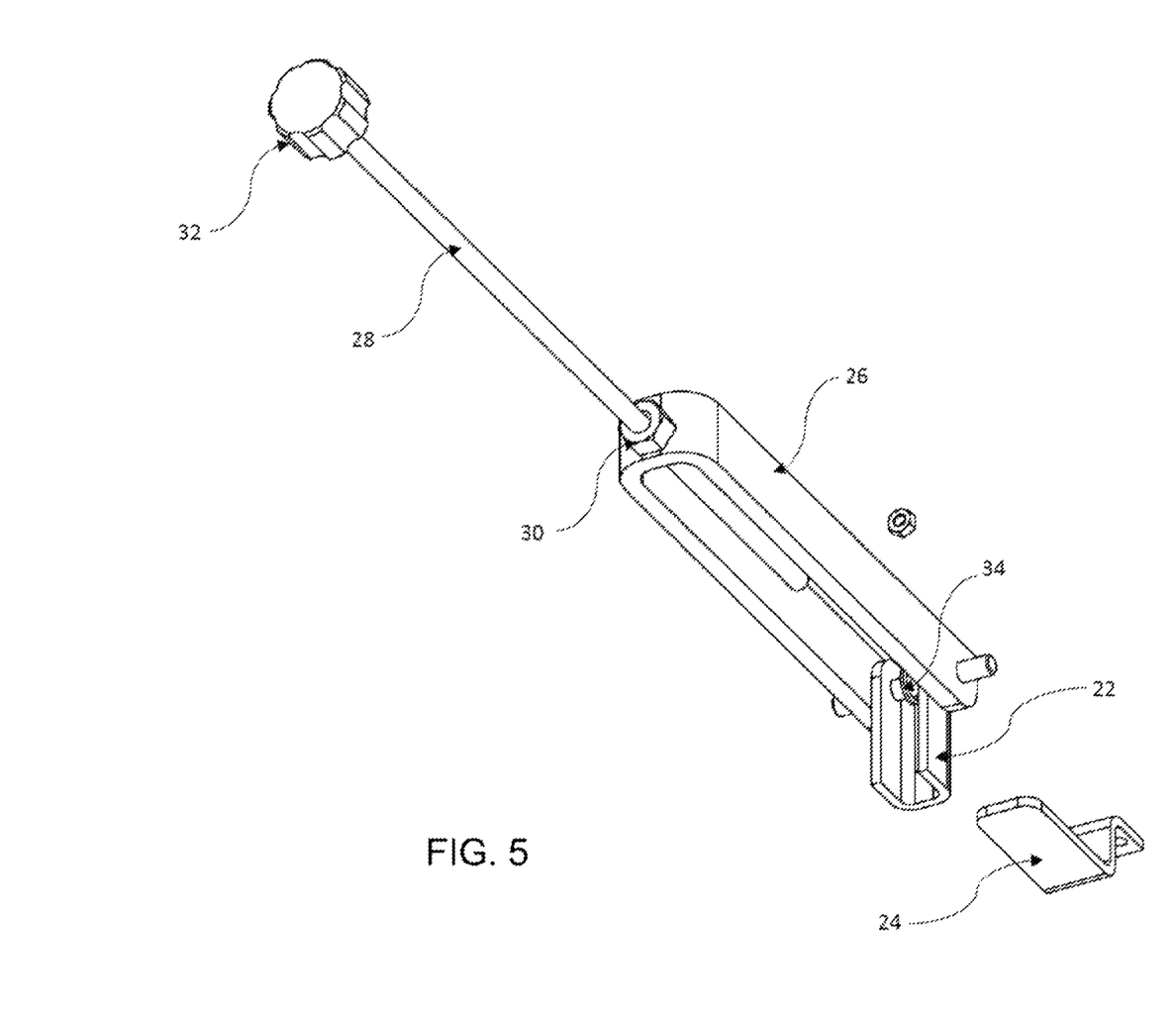
FIG. 5 is a detailed perspective view of a moveable clamp, adjustment arrangement and hook, forming part of the boiler hoist of FIG. 1.
Figure 6:
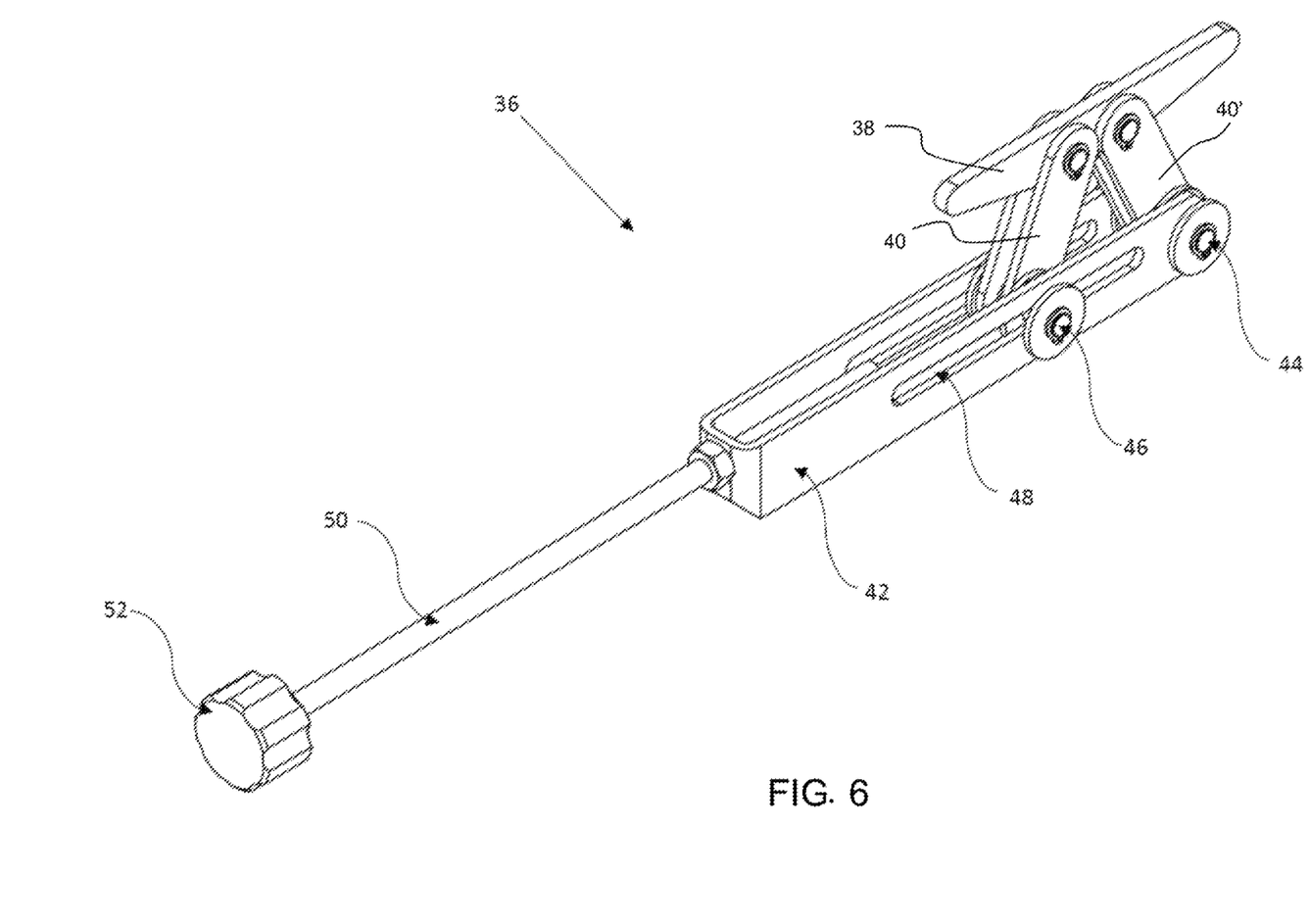
FIG. 6 is a detailed perspective view of an extendable ram, forming part of the boiler hoist of FIG. 1.

The ram 36 itself and associated mechanisms are shown in more detail in FIG. 4. The ram 36 includes a foot 38 of sufficient linear extent to accommodate a range of cavity wall thicknesses. The overall arrangement of the ram 36 is substantially similar to a scissor jack. Two arms 40, 40', as shown in FIGS. 4 and 6, are pivotally mounted to the foot 38 and are also pivotally mounted to a frame 42. The frame is movable relative to the body 20 of the anchor portion 12. The movement is achieved by a threaded rod 50 and handle 52, as shown in FIG. 6, in a similar way that the carriage 26 is moved by threaded rod 28 and handle 32, as shown in FIG. 5. One of the arms 40' is pivotally mounted to the frame 42 on a moving pivot 44, and the other arm 40 is pivotally mounted to the frame 42 on a fixed pivot 46. Note that the moving pivot 44 is fixed to the frame 42, but since the frame moves with respect to the body 20 of the anchor portion 12, the moving pivot 44 moves with respect to the body 20. Likewise, the fixed pivot 46 is movable with respect to the frame 42 in tracks 48, but fixed relative to the anchor body 20.

In some embodiments the ram 36 may be movable along the length of the body, but in this embodiment, it is found acceptable to fix the ram 36 a set distance from the flange 18, relying on the linear extent of the ram 36 to accommodate different thicknesses of cavity wall.

In use, to anchor the hoist 10 to a flue hole drilled in a wall, firstly the ram 36 and clamp 22 are retracted (FIG. 2). The anchor portion in this condition is much smaller in cross section than the diameter of the flue hole, and can easily be pushed in from the inside of the building. Once the anchor portion 12 is fully inserted into the flue hole, up to the point where the flange 18 prevents any further movement, the handle 32 can be turned to move the clamp 22 towards the building (leftwards in FIGS. 2 and 3). As the clamp moves to the left, it is disengaged from the hook 24 and extends automatically by means of the spring 34, as shown in FIG. 5. The handle is turned until the clamp 22 is against the outside wall of the building and cannot be moved any further to the left. At this stage, the anchor portion is in the condition shown in FIG. 3.

The ram 36 is now extended by turning the handle 52, as shown in FIG. 4. The combination of the clamp 22 and the ram 36 provides a very secure anchor in the flue hole, which is more than enough to safely support the weight of a typical boiler.

It will be noted that the whole operation shown in FIGS. 2 through 4 can take place from the inside of the building. There is no need to access the outside of the flue hole, and therefore working at height is avoided where the boiler is being installed on an upper floor in for example flats or apartments.

Figure 7:
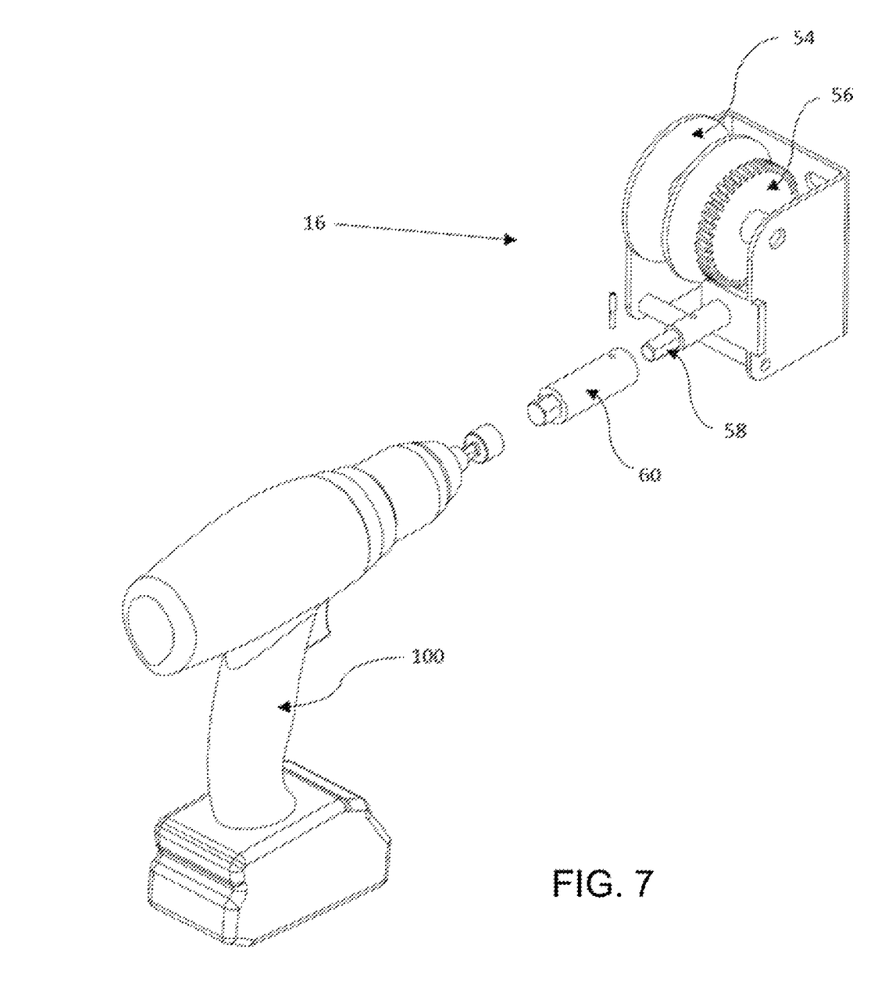
FIG. 7 is a detailed perspective view of a winch and gearbox, forming part of the boiler hoist of FIG. 1.

Referring now to FIG. 7, the winch 16 is shown in more detail. The winch 16 includes a spool 54 which is driven by a worm wheel 56. The worm wheel in turn is driven by a worm, which is not visible in FIG. 7 but is disposed underneath the worm wheel 56 and meshes with the worm wheel. The worm is connected to a drive shaft 58, which can be wound manually by a removable handle (not shown in the drawings) or alternatively can be attached to an electric drill 100 via an adaptor 60.

Figure 8:
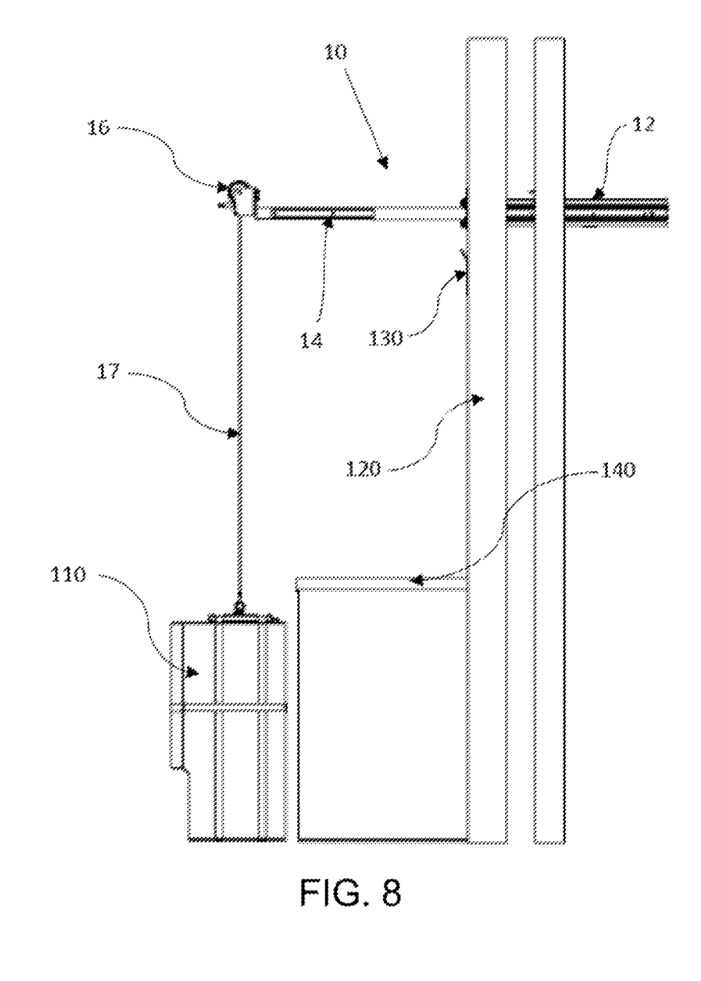
FIGS. 8 and 9 show the boiler hoist of FIG. 1 in use, lifting a boiler into position for installation on a wall.
Figure 9:
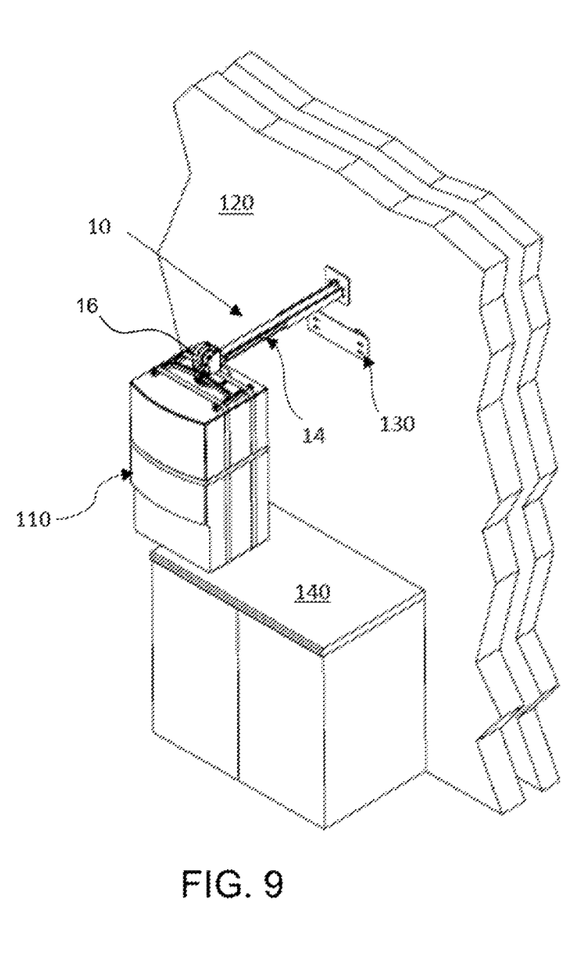

FIGS. 8 and 9 illustrate the boiler hoist 10 being used to install a boiler 110. A flue hole has been drilled through a cavity wall 120, and a mounting bracket 130 to suit the boiler 110 has been fixed to the wall 120 below the flue hole. The anchor section 12 of the hoist 10 has been anchored into the flue hole as per the procedure described and shown in FIGS. 2 to 4. The arm 14 is fully extended in FIG. 8, which allows a boiler 110 to be attached to the winch 16 via a lifting cable 17. Note that the boiler is being fitted above a kitchen worktop 140, which presents a particular challenge to known installation techniques involving manual lifting.

In FIG. 9, the winch 16 has been operated, for example by connecting a cordless drill, to lift the boiler to a height above the bracket 130. The extending arm 14 has also been partially retracted in FIG. 9. The arm 14 will need to be fully retracted in order to move the boiler 110 adjacent the wall 120. The winch 16 may then be operated in the other direction to lower the boiler 110 slightly, to hang it on the bracket 130.

When the boiler is hung on the bracket 130, and possibly additional fixings added, the lifting cable 17 may be disconnected from the boiler, and then the hoist 10 may be removed from the flue hole by retracting the ram 36, moving the clamp 22 to its outermost extent so that it is retracted by the hook 24, and then simply pulling the hoist back into the building, out of the flue hole, as shown in FIGS. 2 to 4. The flue pipe may then be installed through the hole, and the boiler installation completed as per existing practice.

Figure 10:
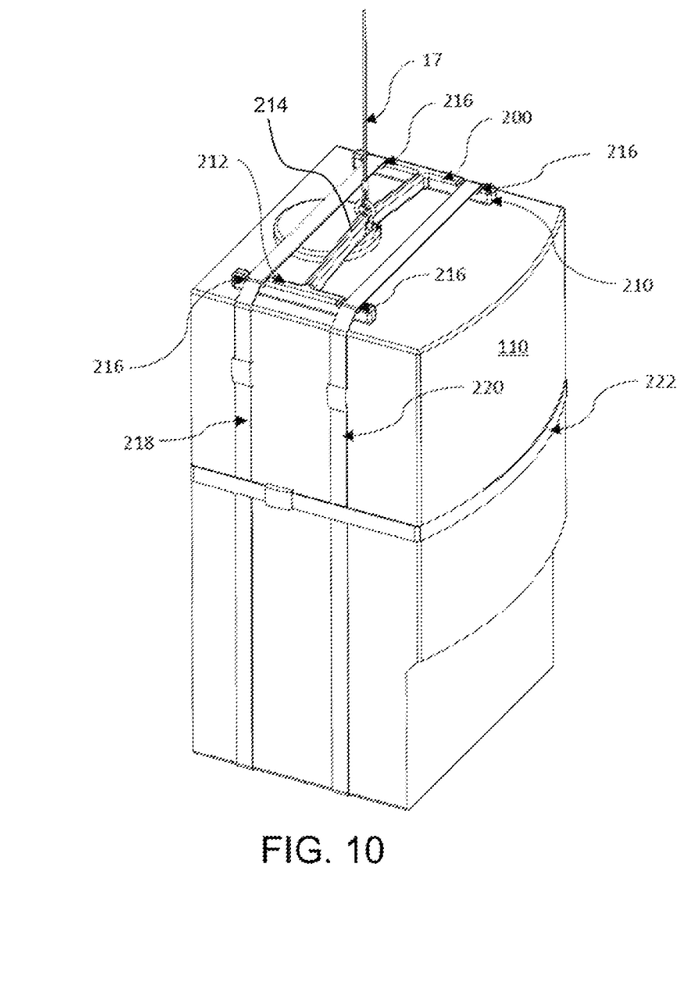
FIG. 10 shows an embodiment of a lifting arrangement for attaching a boiler to a hoist, for example the hoist of FIG. 1.

Referring to FIG. 10, an arrangement for attaching a lifting eye to a boiler is shown. A lifting frame 200 is provided resting on an upper surface of the boiler 110. The lifting frame includes two parallel bars 210, 212. The parallel bars 210, 212 are positioned parallel with the sides of the boiler. The parallel bars are joined to each other via a cross bar 214. The overall shape of the lifting frame 200 is substantially an 'H' shape. A lifting eye is provided in the center of the cross bar 214, which may be attached in use to a lifting line 17, for example via a shackle.

The cross bar in this embodiment is in a shallow inverted 'V' shape, so that the central point of the cross bar 214 where the lifting eye is located is above, rather than against, the upper surface of the boiler. This allows space to install shackles, etc., and also provides clearance for parts of the boiler which may be proud of the upper surface on which the parallel bars 210, 212 sit. For example, the boiler may have a flue attachment which is slightly proud of the upper surface.

Each of the parallel bars 210, 212 include locating means 216 for straps. The locating means are in the form of indents in upper surfaces of the bars 210, 212, but might alternatively be provided for example as rings hoops or anything else which would locate a strap in position relative to the bar.

As shown in FIG. 10, the lifting frame 200 may be firmly attached to the boiler 110 by means of three straps including, a first strap 218 passing over a rear locating means on the first parallel bar 210, a rear locating means on the second parallel bar 212, and around the sides and bottom of the boiler close to the back of the boiler, a second strap 220 passing over a front locating means on the first parallel bar 210, a front locating means on the second parallel bar 212, and around the sides and bottom of the boiler close to the front of the boiler, and a third strap 222 located over the top of the first and second straps, and around the front, back and sides of the boiler.

Figure 11:
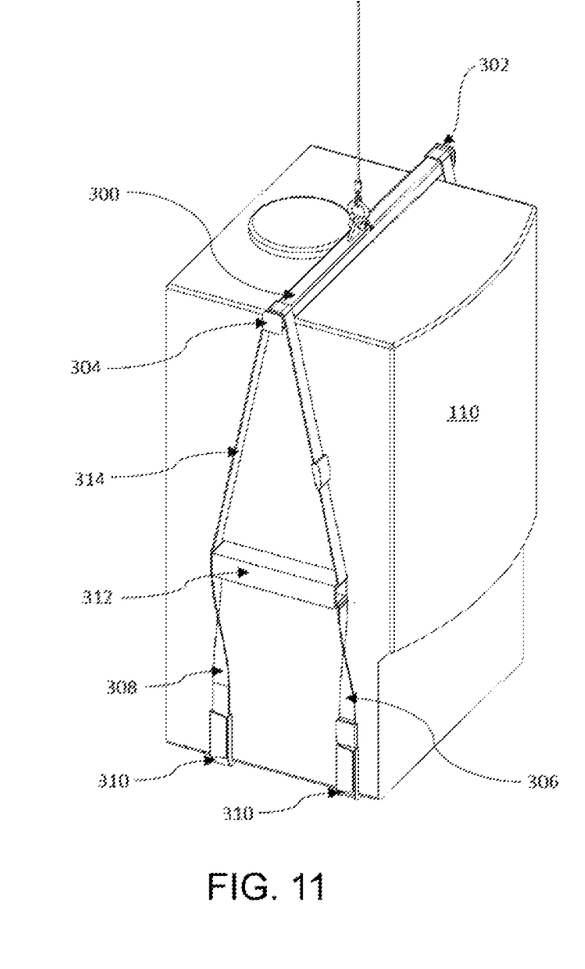
FIG. 11 shows an alternative lifting arrangement for attaching a boiler to a hoist.

FIG. 11 shows an alternative arrangement of a lifting frame. In this embodiment, the lifting frame is in the form of a simple square section bar 300 which in use rests across the top of a boiler 110. The bar 300 is slightly longer than the width of the boiler 110 so that it overhangs on either side. Flanges 302, 304 are provided at the ends of the bar 300. A lifting eye is provided in the center of the bar 300.

A sling 306 is provided to hold the boiler 110 from underneath. The sling 306 preferably includes webbing straps 308 which pass under the boiler. Protecting guides 310 may be provided to avoid any bending to the structure of the boiler by loads from the straps being concentrated at sharp corners. The sling 306 includes an attachment brace 312 at either side, comprising a length of square section bar.

Straps 314 are provided on either side of the boiler, each strap passing over an end section of the straight bar 300, adjacent the flange 302, 304, and through the attachment brace 312. The straps 314 are tightened to firmly fasten the bar 300 to the top of the boiler for safe and secure lifting.

The lifting frames illustrated in FIGS. 10 and 11 may be used in combination with the boiler hoist illustrated in FIGS. 1 to 9, for a safe one-man installation of a wall-mounted boiler. Alternatively, the lifting frames may be used in any other situation where it is useful to provide a lifting eye on a boiler.

What is claimed is:

1. A boiler hoist comprising a rigid elongate anchor for mounting in a flue hole drilled through a wall of a building, and a winch for connection to a boiler for lifting or lowering the boiler,
    in which a flange is provided, the flange defining an end of the elongate anchor and the flange abutting the inside of the wall of the building, around the flue hole, when installed and in use,
    and further comprising a clamp for deploying from the elongate anchor outside the building, and clamping against an outer surface of the wall of the building,
    in which the clamp is retractable into the elongate anchor.

2. The boiler hoist as claimed in claim 1, further comprising an arm which extends from the anchor, the arm extending from the wall of the building, to the inside of the building when installed and in use.

3. The boiler hoist as claimed in claim 2, in which the length of the arm is adjustable.

4. The boiler hoist as claimed in claim 1, further comprising movable ram, the ram being movable in a direction substantially perpendicular to the elongate extent of the anchor to extend the ram from the anchor or tract the ram into the anchor.

5. The boiler hoist as claimed in claim 4, in which the movable ram is in the form of a scissor jack mechanism.

6. The boiler hoist as claimed in claim 1, in which the position of the clamp along the length of the elongate anchor is adjustable.

7. The boiler hoist as claimed in claim 6, in which the clamp is movable along the length of the elongate anchor by means of a screw thread.

8. The boiler hoist as claimed in claim 1, in which the winch includes a spool for a lifting line, a gearbox and a drive shaft.

9. The boiler hoist as claimed in claim 8, in which the gearbox includes a worm and wheel drive.

10. The boiler hoist as claimed in claim 1, provided in combination with a lifting frame for a boiler.

11. A boiler hoist comprising a rigid elongate anchor for mounting from the inside of a building into a flue hole drilled through a wall of the building, and a winch for connection to a boiler inside the building for lifting or lowering the boiler, the boiler hoist being installable and operable from inside the building.

12. The boiler hoist as claimed in claim 11, further comprising a movable ram, the ram being movable in a direction substantially perpendicular to the elongate extent of the anchor to extend the ram from the anchor or retract the ram into the anchor, the boiler hoist being operable to extend or retract the ram from inside the building when the boiler hoist is mounted into the flue hole.

13. The boiler hoist as claimed in claim 11, further comprising a clamp for deploying from the elongate anchor outside the building, and clamping against an outer surface of the wall of the building, the boiler hoist being operable to deploy the clamp from inside the building when the boiler hoist is mounted into the flue hole.

14. The boiler hoist as claimed in claim 13, in which the clamp is retractable into the elongate anchor, the boiler hoist being operable to retract the clamp from inside the building when the boiler hoist is mounted into the flue hole.

15. The boiler hoist as claimed in claim 13, in which the position of the clamp along the length of the elongate anchor is adjustable, the boiler hoist being operable to adjust the position of the clamp from inside the building when the boiler hoist is mounted into the flue hole.

16. A method of installing a boiler the inside of a wall of a building, the method including the steps of:
    providing a flue hole through the wall of the building;
    providing a hoist comprising a rigid elongate anchor and a winch;
    from the inside of the building, mounting the rigid elongate anchor of the hoist into the flue hole;
    attaching the boiler to the winch and using the winch to raise the boiler to a desired installation position;
    fixing the boiler to the wall in the desired installation position; and
    detaching the boiler from the hoist, and removing the boiler hoist from the flue hole.

17. The method of installing a boiler as claimed in claim 16, in which the hoist includes a movable ram, and mounting the rigid elongate anchor of the hoist into the flue hole includes moving the ram in a direction substantially perpendicular to the elongate extent of the anchor to extend the ram from the anchor, the hoist being operated to extend the movable ram from inside the building.

18. The method of installing a boiler as claimed in claim 16, In which the hoist includes a clamp, and mounting the rigid elongate anchor of the hoist into the flue hole includes deploying the clamp from the elongate anchor outside of the building, the hoist being operated to deploy the clamp from inside the building.

19. The method of installing a boiler as claimed in claim 16, in which the hoist includes a movable ram and a clamp, and mounting the rigid elongate anchor of the hoist into the flue hole includes moving the ram in a direction substantially perpendicular to the elongate extent of the anchor to extend the ram from the anchor, and deploying the clamp from the elongate anchor outside of the building, the hoist being operated to extend the movable ram and deploy the clamp from the inside of the building.

20. The method of installing boiler as claimed in claim 19, in which the hoist then includes a flange, the flange defining an end of the elongate anchor, and mounting the rigid elongate anchor of the hoist into the flue hole includes placing the flange in a positing abutting the inside of the wall of the building, around the flue hole.

\* \* \* \* \*